US011106685B2

(12) United States Patent
Dato et al.

(10) Patent No.: US 11,106,685 B2
(45) Date of Patent: Aug. 31, 2021

(54) METHOD TO RANK DOCUMENTS BY A COMPUTER, USING ADDITIVE ENSEMBLES OF REGRESSION TREES AND CACHE OPTIMISATION, AND SEARCH ENGINE USING SUCH A METHOD

(71) Applicant: Istella S.p.A., Milan (IT)

(72) Inventors: Domenico Dato, Pisa (IT); Claudio Lucchese, Vicopisano (IT); Franco Maria Nardini, Vicopisano (IT); Salvatore Orlando, Pisa (IT); Raffaele Perego, Pisa (IT); Nicola Tonellotto, La Spezia (IT); Rossano Venturini, Camaiore (IT)

(73) Assignee: Istella S.p.A., Milan (IT)

( * ) Notice: Subject to any disclaimer, the term of this patent is extended or adjusted under 35 U.S.C. 154(b) by 568 days.

(21) Appl. No.: 15/747,224

(22) PCT Filed: Jun. 17, 2015

(86) PCT No.: PCT/IT2015/000155
§ 371 (c)(1),
(2) Date: Jan. 24, 2018

(87) PCT Pub. No.: WO2016/203501
PCT Pub. Date: Dec. 22, 2016

(65) Prior Publication Data
US 2018/0217991 A1   Aug. 2, 2018

(51) Int. Cl.
*G06F 17/00*     (2019.01)
*G06F 16/2457*   (2019.01)
(Continued)

(52) U.S. Cl.
CPC .... *G06F 16/24578* (2019.01); *G06F 16/2246* (2019.01); *G06F 16/24552* (2019.01);
(Continued)

(58) Field of Classification Search
None
See application file for complete search history.

(56) References Cited

U.S. PATENT DOCUMENTS 5,825,944 A * 10/1998 Wang ............... G06K 9/033
                                                     382/309
6,662,354 B1 * 12/2003 Krablin ............ G06F 8/433
                                                     717/140

(Continued)

OTHER PUBLICATIONS

Search Report and Written Opinion dated Feb. 24, 2016 of corresponding International application No. PCT/IT2015/000155; 17 pgs.

(Continued)

*Primary Examiner* — Hasanul Mobin
(74) *Attorney, Agent, or Firm* — Maier & Maier, PLLC

(57) ABSTRACT

The present invention concerns a novel method to efficiently score documents (texts, images, audios, videos, and any other information file) by using a machine-learned ranking function modeled by an additive ensemble of regression trees. A main contribution is a new representation of the tree ensemble based on bitvectors, where the tree traversal, aimed to detect the leaves that contribute to the final scoring of a document, is performed through efficient logical bitwise operations. In addition, the traversal is not performed one tree after another, as one would expect, but it is interleaved, feature by feature, over the whole tree ensemble. Tests conducted on publicly available LtR datasets confirm unprecedented speedups (up to 6.5×) over the best state-of-the-art methods.

8 Claims, 6 Drawing Sheets

(51) Int. Cl.
*G06N 20/00* (2019.01)
*G06F 16/93* (2019.01)
*G06F 16/22* (2019.01)
*G06F 16/9535* (2019.01)
*G06F 16/2455* (2019.01)
*G06F 16/903* (2019.01)
*G06N 20/20* (2019.01)
*G06N 5/04* (2006.01)

(52) U.S. Cl.
CPC ........ *G06F 16/90335* (2019.01); *G06F 16/93* (2019.01); *G06F 16/9535* (2019.01); *G06N 5/04* (2013.01); *G06N 20/00* (2019.01); *G06N 20/20* (2019.01)

(56) References Cited

U.S. PATENT DOCUMENTS

| | | | | |
|---|---|---|---|---|
| 7,181,438 | B1* | 2/2007 | Szabo | G06F 21/6245 |
| 7,805,438 | B2* | 9/2010 | Liu | G06F 16/3346 |
| | | | | 707/723 |
| 7,895,225 | B1* | 2/2011 | Thirumalai | G06F 16/355 |
| | | | | 707/758 |
| 8,954,423 | B2* | 2/2015 | Chica | G06F 40/237 |
| | | | | 707/723 |
| 9,430,131 | B1* | 8/2016 | Zhang | G06F 3/04842 |
| 9,836,461 | B1* | 12/2017 | Mishne | G06F 16/93 |
| 10,013,489 | B2* | 7/2018 | Jones | G06F 16/951 |
| 2002/0165860 | A1* | 11/2002 | Glover | G06F 16/951 |
| 2009/0328014 | A1* | 12/2009 | Kejariwal | G06F 9/30072 |
| | | | | 717/140 |
| 2010/0070457 | A1 | 3/2010 | Kejariwal et al. | |
| 2011/0161076 | A1* | 6/2011 | Davis | G06K 9/6202 |
| | | | | 704/231 |
| 2011/0244919 | A1* | 10/2011 | Aller | G06Q 30/0281 |
| | | | | 455/556.1 |
| 2011/0314007 | A1* | 12/2011 | Dassa | G06F 16/22 |
| | | | | 707/723 |
| 2012/0166284 | A1* | 6/2012 | Tseng | G06Q 30/0273 |
| | | | | 705/14.58 |
| 2014/0025673 | A1* | 1/2014 | Sinha | G06Q 10/101 |
| | | | | 707/732 |
| 2015/0324454 | A1* | 11/2015 | Roberts | G06F 16/9032 |
| | | | | 707/734 |
| 2016/0275289 | A1* | 9/2016 | Sethumadhavan | G06F 21/52 |
| 2016/0306877 | A1* | 10/2016 | Winther | G06F 16/334 |

OTHER PUBLICATIONS

Nima Asadi et al., "Runtime Optimizations for Tree-Based Machine Learning Models", IEEE Transactions on Knowledge and Data Engineering, 2014, p. 2281-2292, vol. 26; 12 pgs.

Goetz Graefe et al., "B-tree indexes and CPU Caches", International Conference on Data Engineering, 2001, p. 349-358; 10 pgs.

Xun Tang et al., "Cache-conscious runtime optimization for ranking ensembles", Research & Development in Information Retrieval, 2014, p. 1123-1126; 4pgs.

* cited by examiner

METHOD TO RANK DOCUMENTS BY A COMPUTER, USING ADDITIVE ENSEMBLES OF REGRESSION TREES AND CACHE OPTIMISATION, AND SEARCH ENGINE USING SUCH A METHOD

FIELD

The present invention concerns a method to rank documents by a computer, using additive ensembles of regression trees and cache optimisation, and search engine using such a method.

More in detail, the present invention concerns a novel method to efficiently score documents (texts, images, audios, videos, and any other information file) by using a machine-learned ranking function modelled by an additive ensemble of regression trees. A main contribution is a new representation of the tree ensemble based on bitvectors, where the tree traversal, aimed to detect the leaves that contribute to the final scoring of a document, is performed through efficient logical bitwise operations. In addition, the traversal is not performed one tree after another, as one would expect, but it is interleaved, feature by feature, over the whole tree ensemble. Tests conducted on publicly available LtR datasets confirm unprecedented speedups (up to 6.5×) over the best state-of-the-art methods.

BACKGROUND

The computers are designed to process instructions one by one, completely processing one instruction before beginning the next instruction in the sequence. A significant improvement in performance is obtained by using caches and branch prediction mechanisms. Making reference to the prior art FIG. 2, a computer essential structure 10 is illustrated, including a CPU 11 and a branch prediction mechanism 12 installed on the CPU 11, a cache controller 13 connected to a cache memory 14 and to a bus 15, which is in turn connected to input/output means 16 and memory means 17. Such an architecture may be used with the method according to the invention.

A cache memory 14 is a typically small but fast memory holding recently accessed data. Accessing data stored in cache requires a single clock cycle, while accessing data stored in main memory 17 requires several clock cycles. A cache controller 13 is responsible for transparently provide data access to the processor 11 and manage the cache content. When the cache is full and the cache controller needs to store other data into the cache, a cache entry is evicted and written back into main memory, if necessary. The new data is then inserted into the cache. The performance benefits of a cache memory depend on the access patterns of the running program, i.e., the sequence of memory locations being read and/or written during its execution: larger amounts of program instructions/data found in cache lead to faster programs. Cache eviction policies are designed to exploit high spatial locality: if a memory location is accessed, then nearby memory locations are likely to be accessed in the next few clock cycles. Thus, a running program should maximize its spatial locality by carefully laying out its instructions and data (e.g., in array data structures) so that they will be accessed sequentially and, hence, increase cache access rate. Instead random accesses to instructions/data that are not located close together in memory typically lead to poor cache performance.

In a modern computer, instructions are dived in stages, which are processed simultaneously in pipeline. Different stages of different instructions may proceed in parallel in one clock cycle in separate portions of the processor. If a branch instruction, such as a jump or a conditional branch, is in the sequence of instructions, a modern computer faces the problem of deciding the next instruction to process depending on the branch result. Hence the processor tries to predict the outcome of the branch instruction, then inserting the corresponding instructions into the pipeline immediately following the branch instruction. As soon as the processor knows that a prediction was wrong, it must discard the whole pipeline content to execute the correct branch, thus incurring in a substantial performance penalty.

The branch prediction mechanism is typically implemented in hardware on the processor chip, and it allows huge performance gains if the predictions are accurate. Repetitive loops such as for-to-do commands are easily predictable: the instructions in a loop are always re-executed except on the single case in which the loop condition is false. Conversely, conditional statements such as if-then-else commands are usually largely unpredictable.

GRADIENT-BOOSTED REGRESSION TREES (GBRT) [4] and LAMBDA-MART ($\Lambda$-MART) [18] are two of the most effective Learning-to-Rank (LtR) algorithms. They both generate additive ensembles of regression trees aiming at predicting the relevance labels $y_i$ of a query document pair $(q, d_i)$ (the ensembles are "additive" because the final score is obtained as a summation over the partial scores obtained for each tree of the model). The GBRT algorithm builds a model by approximating the root mean squared error on a given training set. This loss function makes GBRT a point-wise LtR algorithm, i.e., query-document pairs are exploited independently. The $\Lambda$-MART algorithm improves over GBRT by directly optimizing list-wise information retrieval measures such as NDCG [6]. Thus, $\Lambda$-MART aims at finding a scoring function that generates an ordering of documents as close as possible to the ideal ranking. In terms of scoring process there is thus no difference between $\Lambda$-MART and GBRT, since they both generate a set of weighted regression trees.

In the present invention, we propose algorithms and optimizations for scoring efficiently documents by means of regression tree ensembles. Indeed, the findings of this invention apply beyond LtR, and in any application where large ensembles of regression trees are used for classification or regression tasks.

Each query-document pair $(q, d_i)$ is represented by a real-valued vector x of features, namely $x \in \mathbb{R}^{|\mathcal{F}|}$ with $\mathbb{R}$ the ensemble of real values and wherein $\mathcal{F} = \{f_o, f_1, \ldots\}$ is the set of features characterizing the candidate document $d_i$ and the user query q, and $x[i]$ stores feature $f_i$. Let $\mathcal{T}$ be an ensemble of trees representing the ranking model. Each tree $T = (N, L)$ in $\mathcal{T}$ is a decision tree composed of a set of internal nodes $N = \{n_0, n_1, \ldots\}$, and a set of leaves $L = \{l_0, l_1, \ldots\}$. Each $n \in N$ is associated with a Boolean test over a specific feature with id $\varphi$, i.e. $f_\varphi \in \mathcal{F}$, and a constant threshold $\gamma \in \mathbb{R}$. This test is in the form $x[\varphi] \leq \gamma$. Each leaf $l \in L$ stores the prediction $l.val \in \mathbb{R}$, representing the potential contribution of tree T to the final score of the document.

All the nodes whose Boolean conditions evaluate to FALSE are called false nodes, and true nodes otherwise. The scoring of a document represented by a feature vector x requires the traversing of all the trees in the ensemble, starting at their root nodes. If a visited node in N is a false one, then the right branch is taken, and the left branch otherwise. The visit continues until a leaf node is reached, where the value of the prediction is returned. Such leaf node is named exit leaf and denoted by $e(x) \in L$. We omit x when it is clear from the context.

Hereinafter, we assume that nodes of T are numbered in breadth-first order and leaves from left to right, and let $\varphi_i$ and $\gamma_i$ be the feature id and threshold associated with i-th internal node, respectively. It is worth noting that the same feature can be involved in multiple nodes of the same tree. For example, in the tree shown in FIG. 1, the features $f_0$ and $f_2$ are used twice. Assuming that x is such that $x[2] > \gamma_0$, $x[3] \leq \gamma_2$, and $x[0] \leq \gamma_3$, the exit leaf e of the tree in the FIG. 1 is the leaf $l_2$.

The tree traversal process is repeated for all the trees of the ensemble $\mathcal{T}$, denoted by $\mathcal{T} = \{T_0, T_1, \ldots\}$. The score s(x) of the whole ensemble is finally computed as a weighted sum over the contributions of each tree $T_h = (N_h, L_h)$ in $\mathcal{T}$ as:

$$s(x) = \sum_{h=0}^{|\mathcal{T}|-1} w_h \cdot e_h(x) \cdot val$$

where $e_h(x)$.val is the predicted value of tree $T_h$, having weight $w_h \in \mathbb{R}$.

In the following we review state-of-the-art optimization techniques for the implementation of additive ensemble of regression trees and their use in document scoring.

A naïve implementation of a tree traversal may exploit a node data structure that stores the feature id, the threshold and the pointers to the left and right children nodes. The traversal starts from the root and moves down to the leaves accordingly to the results of the Boolean conditions on the traversed nodes. This method can be enhanced by using an optimized data layout in [1]. The resulting algorithm is named STRUCT+. This simple approach entails a number of issues. First, the next node to be processed is known only after the test is evaluated. As the next instruction to be executed is not known, this induces frequent control hazards, i.e., instruction dependencies introduced by conditional branches. As a consequence, the efficiency of a code strongly depends on the branch mis-prediction rate [8]. Finally, due to the unpredictability of the path visited by a given document, the traversal has low temporal and spatial locality, generating low cache hit ratio. This is apparent when processing a large number of documents with a large ensemble of trees, since neither the documents nor the trees may fit in cache.

Another basic, but well performing approach is IF-THEN-ELSE. Each decision tree is translated into a sequence of if-then-else blocks, e.g. in C++. The resulting code is compiled to generate an efficient document scorer. IF-THEN-ELSE aims at taking advantage of compiler optimization strategies, which can potentially re-arrange the tree ensemble traversal into a more efficient procedure. The size of the resulting code is proportional to the total number of nodes in the ensemble. This makes it impossible to exploit successfully the instruction cache. IF-THEN-ELSE was proven to be efficient with small feature sets [1], but it still suffers from control hazards.

Asadi et al. [1] proposed to rearrange the computation to transform control hazards into data hazards, i.e., data dependencies introduced when one instruction requires the result of another. To this end, node $n_s$ of a tree stores, in addition to a feature id $\varphi_s$ and a threshold $\gamma_s$, an array idx of two positions holding the addresses of the left and right children nodes data structures. Then, the output of the test $x[\varphi_s] > \gamma_s$ is directly used as an index of such array in order to retrieve the next node to be processed. The visit of a tree of depth d is then statically "un-rolled" in d operations, starting from the root node $n_0$, as follows:

$$d \text{ steps} \begin{cases} i \leftarrow n_0 \cdot idx[x[\phi_0] > \gamma_0] \\ i \leftarrow n_i \cdot idx[x[\phi_i] > \gamma_i] \\ \vdots \\ i \leftarrow n_i \cdot idx[x[\phi_i] > \gamma_i] \end{cases}$$

Leaf nodes are encoded so that the indexes in idx generate self loops, with dummy $\varphi_s$ and $\gamma_s$. At the end of the visit, the exit leaf is identified by variable i, and a look-up table is used to retrieve the prediction of the tree. This approach, named Pred, removes control hazards as the next instruction to be executed is always known. On the other hand, data dependencies are not solved as the output of one instruction is required to execute the subsequent. Memory access patterns are not improved either, as they depend on the path along the tree traversed by a document. Finally, Pred introduces a new source of overhead: for a tree of depth d, even if document reaches a leaf early, the above d steps are executed anyway. To reduce data hazards the same authors proposed a vectorized version of the scoring algorithm, named VPred, by interleaving the evaluation of a small set of documents (16 was the best setting). VPred was shown to be 25% to 70% faster than Pred on synthetic data, and to outperform other approaches. The same approach of Pred was also adopted in some previous works exploiting GPUs [11], and a more recent survey evaluates the trade-off among multi-core CPUs, GPUs and FPGA [13].

In the invention description below we compare the invention method against VPred which can be considered the best performing algorithm at the state of the art. In the experimental section, we show that the proposed invention "QS" method has reduced control hazard, smaller branch mis-prediction rate and better memory access patterns.

Memory latency issues of scoring algorithms are tackled in Tang et al. [12]. In most cases, the cache memory may be insufficient to store the candidate documents to be scored and/or the set of regression trees. The authors propose a cache-conscious optimization by splitting documents and regression trees in blocks, such that one block of documents and one block of trees can both be stored in cache at the same time. Computing the score of all documents requires to evaluate all the tree blocks against all the document blocks. Authors applied this computational scheme on top of both If-Then-Else and Pred, with an average improvement of about 28% and 24% respectively. The blocking technique is indeed very general and can be used by all algorithms. The same computational schema is applied to the invention "QS" method in order to improve the cache hit ratio when large ensembles are used.

Unlike the invention method that aims to devise an efficient strategy for fully evaluating the ensemble of trees, other approaches tries to approximate the computation over the ensemble for reducing the scoring time. Cambazoglu et al. [3] proposed to early terminate the scoring of documents that are unlikely to be ranked within the top-k results. Their work applies to an ensemble of additive trees like the one considered by the present invention, but the authors aims to save scoring time by reducing the number of tree traversals, and trades better efficiency for little loss in ranking quality.

Although the invention method is thought for globally optimizing the traversal of thousands of trees, the idea of early termination can be applied as well along with the invention method, by evaluating some proper exit strategy after the evaluation of some subsets of the regression trees.

Wang et al. [15, 16, 17] deeply investigated different efficiency aspects of the ranking pipeline. In particular, in [16] they propose a novel cascade ranking model, which unlike previous approaches, can simultaneously improve both top-k ranked effectiveness and retrieval efficiency. Their work is mainly related to the tuning of a two-stage ranking pipeline.

Patent Application EP 1 434 148 B1 introduces a multi-bit trie network search engine implemented by a number of pipeline logic units corresponding to the number of longest-prefix strides and a set of memory blocks for holding prefix tables. Each pipeline logic unit is limited to one memory access, and the termination point within the pipeline logic unit chain is variable to handle different length prefixes. The patent also defines a method of operating a multi-bit trie search engine comprising processing an address prefix for a route search collectively within a series of pipeline units to determine a match to a value within an entry for a routing table.

Patent Application US 2014/0337255 A1 illustrates improvements to machine learning for ensembles of decision trees exploiting several techinques used in the computer vision fields. These techniques are based on function inlining, C++ concepts such as templating, and buffer contiguity, and as such, are orthogonal to the proposed purely algorithmic methods.

SUMMARY

It is object of the present invention to provide a method and a system and a search engine which solve the problems and overcomes the drawbacks of the prior art.

It is subject-matter of the present invention a method, a system and a search engine according to the enclosed claims, which are an integral part of the present description.

Ranking query results according to a relevance criterion is a fundamental problem in Information Retrieval (IR). Nowadays, an emerging research area named Learning-to-Rank (LtR) [2,7] has shown that effective solutions to the ranking problem can leverage machine learning techniques. A LtR-based function, which scores a set of candidate documents according to their relevance to a given user query, is learned from a ground-truth composed of many training examples. The examples are basically a collection of queries Q, where each query q∈Q is associated with a set of assessed documents D={$d_0, d_1, \ldots$}. Each pair (q, $d_i$) is in turn labeled by a relevance judgment $y_i$, usually a positive integer in a fixed range, stating the degree of relevance of the document for the query. These labels induce a partial ordering over the assessed documents, thus defining their ideal ranking [6]. The scoring function learned by a LtR algorithm aims to approximate the ideal ranking from the examples observed in the training set.

The ranking process is particularly challenging for Web search engines, which, besides the demanding requirements for result pages of high quality in response to user queries, have also to deal with efficiency constraints, which are not so common in other ranking-based applications. Indeed, two of the most effective LtR-based rankers are based on additive ensembles of regression trees, namely GRADIENT-BOOSTED REGRESSION TREES (GBRT) [4], and LAMBDA-MART (Λ-MART) [18]. Due to the thousands of trees to be traversed at scoring time for each document, these rankers are also the most expensive in terms of computational time, thus impacting on response time and throughput of query processing. Therefore, devising techniques and strategies to speed-up document ranking without loosing in quality is definitely an urgent research topic in Web search [3, 5, 10, 14, 19].

Usually, LtR-based scorers are embedded in complex two-stage ranking architectures [3, 16], which avoid applying them to all the documents possibly matching a user query. The first stage retrieves from the inverted index a relatively large set of possibly relevant documents matching the user query. This phase is aimed at optimizing the recall and is usually carried out by using a simple and fast ranking function, e.g., BM25 combined with some document-level scores [9]. LtR-based scorers are used in the second stage to re-rank the candidate documents coming from the first stage, and are optimized for high precision. In this two-stage architecture, the time budget available to re-rank the candidate documents is limited, due to the incoming rate of queries and the users' expectations in terms of quality-of-service. Strongly motivated by time budget considerations, the IR community has started to investigate low-level optimizations to reduce the scoring time of the most effective LtR rankers based on ensembles of regression trees, by dealing with features and peculiarities of modern CPUs and memory hierarchies [1, 12].

In this work we advance the state of the art in this field, and propose QUICKSSCORER(QS), a new method to score documents with an ensemble of regression trees. The main contributions of our proposal are:
- a novel representation of an ensemble of binary regression trees based on bitvectors, allowing QS to perform a fast interleaved traversal (i.e. a traversal which is not made by traversing each tree in the order, but a feature in all the trees) of the trees by using efficient logical bitwise operations. The performance benefits of the resulting traversal are unprecedented, due to a cache-aware approach, both in terms of data layout and access patterns, and to a program control flow that entails very low branch mis-prediction rates (see for a definition http://en.wikipedia.org/wiki/Branch_predictor);
- an extensive experimental assessment conducted on publicly available LtR datasets with various Λ-MART models, differing for both the size of the ensemble and the number of tree leaves. The results of the experiments show that QS achieves impressive speedups over the best state-of-the-art competitor, ranging from 2× up to 6.5×. Moreover, to motivate the very good performance of QS over competitors, we evaluate in-depth some CPU counters that measure important performance events, such as number of instructions executed, cache-misses suffered, or branches mis-predicted;
- a block-wise version of QS for scoring large tree ensembles and large sets of documents. BLOCKWISE-QS (BWQS) splits the set of documents and the tree ensemble in disjoint groups that can be processed separately. Our experiments show that BWQS performs up to 1.55 times better than the original QS, thanks to cache reuse which reduces cache misses.

It is here recalled that, in digital computer programming, a bitwise operation operates on one or more bit patterns or binary numerals at the level of their individual bits. It is a fast, primitive action directly supported by the processor, and is used to manipulate values for comparisons and calculations.

The invention will be now described by way of illustration but not by way of limitation, with particular reference to the drawings of the enclosed figures, wherein.

DETAILED DESCRIPTION

Figure 1:
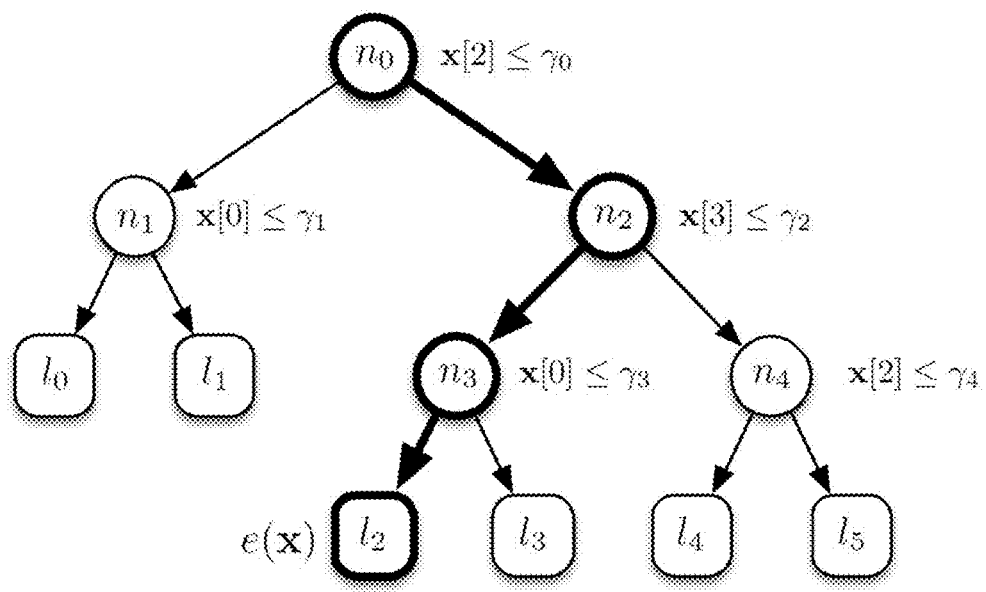
FIG. 1 shows a decision tree according to prior art.
Figure 2:
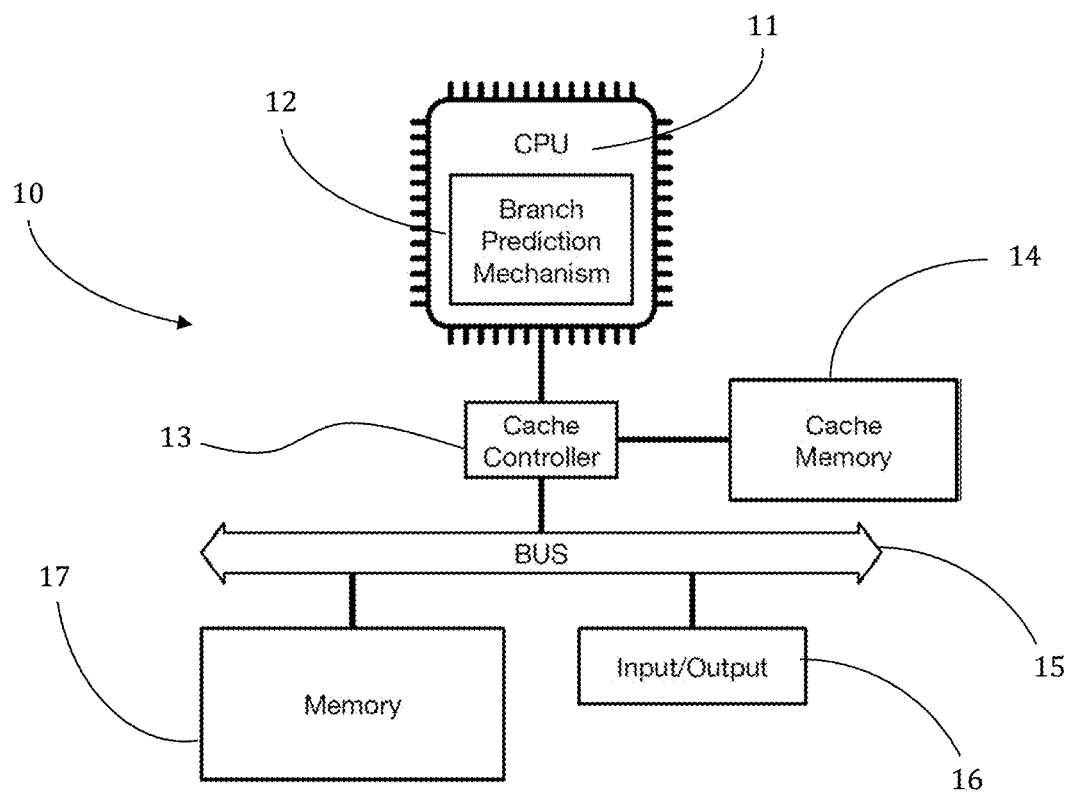
FIG. 2 shows a computer architecture of the prior art that can be used in the present invention.

In order to efficiently exploit memory hierarchies and to reduce the branch mis-prediction rate, we propose a method based on a totally novel traversal of the trees ensemble, which is here called QUICKSCORER (QS). The building block of our approach is an alternative method for tree traversal based on bitvector computations, which is presented in the following subsection. Given a tree and a vector of document features, our traversal processes all its nodes and produces a bitvector which encodes the exit leaf for the given document. In isolation this traversal is not particularly advantageous over the others, since in principle it requires to evaluate all the nodes of a tree. However, it has the nice property of being insensitive to the order in which the nodes are processed. This makes it possible to interleave the evaluation of the trees in the ensemble in a cache-aware fashion. In addition, the proposed bitvector encoding allows to save the computation of many test conditions.

It is here recalled that a bit array (also known as bitmap, bitset, bit string, or bitvector) is an array data structure that compactly stores bits. It can be used to implement a simple set data structure. A bit array is effective at exploiting bit-level parallelism in hardware to perform operations quickly. A typical bit array stores k·w bits, where w is the number of bits in the unit of storage, such as a byte or word, and k is some nonnegative integer. If w does not divide the number of bits to be stored, some space is wasted due to internal fragmentation.

The interleaved evaluation of a trees ensemble is discussed. Intuitively, rather than traversing the ensemble tree after tree, our method performs a global visit of the ensemble by traversing portions of all the trees together, feature by feature. For each feature, we store all the associated thresholds occurring anywhere in the ensemble in a sorted array, to easily compute the result of all the test conditions involved. A bitvector for each tree is updated after each test, in such a way to encode, at the end of the process, the exit leaves in each tree for a given document. These bitvector are eventually used to lookup the predicted value of each tree.

We start by presenting a simpler version of our tree traversal and, then, we introduce two advantageous refinements for the performance of this method when used in the interleaved evaluation of all the trees as described in the following subsection.

Given an input feature vector x and a tree $T_h=(N_h, L_h)$, our tree traversal method processes the internal nodes of $T_h$ with the goal of identifying a set of candidate exit leaves, denoted by $C_h$ with $C_h \subseteq L_h$, which includes the actual exit leaf $e_h$. Initially $C_h$ contains all the leaves in $L_h$, i.e., $C_h=L_h$. Then, the method evaluates one after the other in an arbitrary order the test conditions of all the internal nodes of $T_h$. Considering the result of the test for a certain internal node $n \in N_h$, the method is able to infer that some leaves cannot be the exit leaf and, thus, can safely remove them from $C_h$. Indeed, if n is a false node (i.e., its test condition is false), the leaves in the left subtree of n cannot be the exit leaf and they can be safely removed from $C_h$. Similarly, if n is a true node, the leaves in the right subtree of n can be removed from $C_h$. It is easy to see that, once all the nodes have been processed, the only leaf left in $C_h$ is the exit leaf $e_h$.

The first refinement uses a oracle, called by the Inventors FindFalse, that, given $T_h$ and x, returns the false nodes in $N_h$ without the need of evaluating all the associated test conditions. Then, the method removes from $C_h$ the leaves in the left subtrees of all the false nodes returned by the oracle. For the moment we concentrate on the set $C_h$ obtained at the end of the method and we defer the materialization of the above oracle to next subsection where the interleaved evaluation of all the trees makes its implementation possible. Observe that $C_h$ may now contain several leaves. As an extreme example, the set $C_h$, in absence of false nodes, will contain all the leaves in $L_h$. Interestingly, we can prove (see Theorem below) that the exit leaf $e_h$ is always the one associated with the smallest identifier in $C_h$, i.e., the leftmost leaf in the tree. A running example is reported in FIG. 1 which shows the actual traversal (bold arrows) for a vector x, and also the true and false nodes. The figure shows also the set $C_h$ after the removal of the leaves of the left subtrees of false nodes: $C_h$ is $\{l_2, l_3, l_5\}$ and, indeed, the exit leaf is the leftmost leaf in $C_h$, i.e., $e_h=l_2$.

Figure 3:
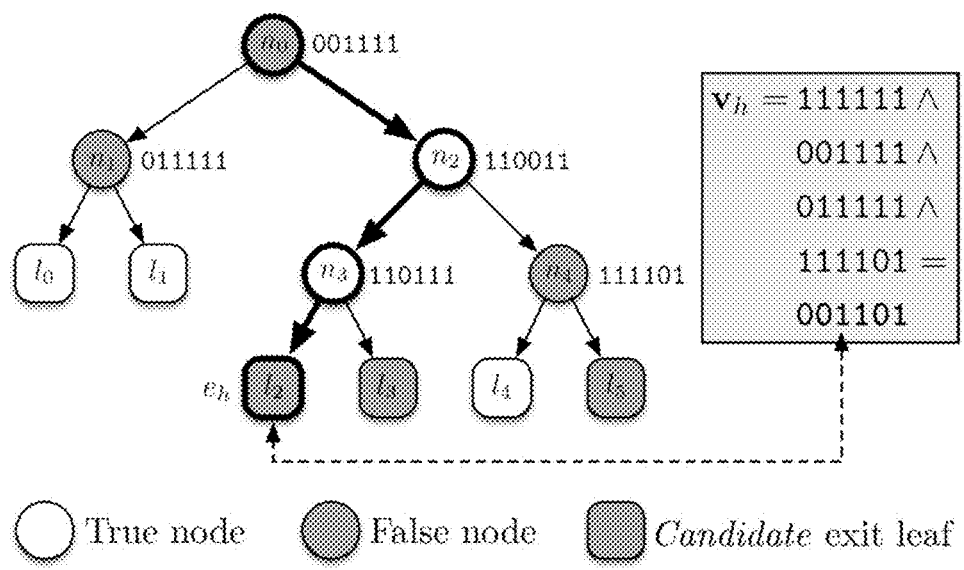
FIG. 3 is a tree traversal example, according to an aspect of the invention.

The second refinement implements the operations on $C_h$ with fast operations on compact bitvectors. The additional technical concept is to represent $C_h$ with a bitvector $v_h$, where each bit corresponds to a distinct leaf in $L_h$, i.e., $v_h$ is the characteristic vector of $C_h$. Every internal node n is associated with a node bitvector (of the same length), acting as a bitmask that encodes (with 0's) the set of leaves to be removed from $C_h$ whenever n is a false node. This way, the bitwise logical AND between $v_h$ and the node bitvector of a false node n corresponds to the removal of the leaves in the left subtree of n from $C_h$. We finally observe that the exit leaf corresponds to the leftmost bit set to 1 in $v_h$. FIG. 3 shows how the initial bitvector $v_h$ is updated by using bitwise logical AND operations.

The latter full approach is described in Method 1. Given a binary tree $T_h=(L_h, N_h)$ and an input feature vector x, let u.bitvector be the precomputed bitwise mask associated with a generic $n \in N_h$. First the result bitvector $v_h$ is initialized with all bits set to 1. Then, FindFalse(x, $T_h$) returns all the false nodes in $N_h$. For each of such nodes, $v_h$ is masked with the corresponding node bitvector. Finally, the position of the leftmost bit of $v_h$ identifies the exit leaf $e_h$, whose output value is Method 1: Scoring a feature vector x using
a binary decision tree $\mathcal{T}_h$ Input :
● x: input feature vector
● $\mathcal{T}_h = (N_h, L_h)$: binary decision tree, with
  - $N_h = \{n_0, n_1,...\}$: internal nodes of $\mathcal{T}_h$
  - $L_h = \{l_0, l_1,...\}$: leaves of $\mathcal{T}_h$
  - n.bitvector: node bitvector associated with
    $n \in N_h$
  - $l_j$.val: output value associated with $l_j \in L_h$
Output:
● tree traversal output value
Score(x, $\mathcal{T}_h$):
1 | $v_h \leftarrow 11...11$
2 | $U \leftarrow$ FindFalse(x, $\mathcal{T}_h$)
3 | foreach node $u \in U$ do
4 | |_ $v_h \leftarrow v_h \wedge$ u.bitvector
5 | $j \leftarrow$ index of leftmost bit set to 1 of $v_h$
6 |_ return $l_j$.val returned. The correctness of this approach is stated by the following theorem.
Theorem 1 Method 1 is correct.
Proof. We prove that for each binary decision tree $T_h$ and input feature vector x, Method 1 always computes a result bitvector $v_h$, where the leftmost bit set to 1 corresponds to the exit leaf $e_h$. First, we prove that the bit corresponding to the exit leaf eh in the result bitvector $v_h$ is always set to 1. Consider the internal nodes along the path from the root to $e_h$, and observe that only the bitvectors applied for those nodes may change the $e_h$'s bit to 0.

Since $e_h$ is the exit leaf, it belongs to the left subtree of any true node and to the right subtree of any false node in this path. Thus, since the bitvectors are used to set to 0 leaves in the left subtrees of false nodes, the bit corresponding to $e_h$ remains unmodified, and, thus, will be 1 at the end of Method 1. Second, we prove that the leftmost bit equal to 1 in $v_h$ corresponds to the exit leaf $e_h$. Let $l_\leftarrow$ be the leaf corresponding to the leftmost bit set to 1 in $v_h$. Assume by contradiction that $e_h$ is not the leftmost bit set to 1 in $v_h$, namely, $l_\leftarrow \neq e_h$. Let u be their lowest common ancestor node in the tree. Since $l_\leftarrow$ is smaller than $e_h$, the leaf $l_\leftarrow$ belongs to u's left subtree while the leaf eh belongs to u's right subtree. This leads to a contradiction. Indeed, on one hand, the node u should be a true node otherwise its bitvector would have been applied setting $l_\leftarrow$'s bit to 0. On the other hand, the node u should be a false node since $e_h$ is in its right subtree. Thus, we conclude that $l_\leftarrow = e_h$ proving the correctness of Method 1.

Method 1 represents a general technique to compute the output value of a single binary decision tree stored as a set of precomputed bitvectors. Given an additive ensemble of binary decision trees, to score a document x we have to loop over all the trees $T_h \in \mathcal{T}$ by repeatedly applying Method 1. Unfortunately, this method is not particularly satisfactory, since this method does not permit us to implement efficiently FindFalse(x, $T_h$).

In the following section we present the invention method QS, which overcomes this issue by performing a global visit of the whole tree ensemble $\mathcal{T}$. The QS method realizes the goal of identifying efficiently the false nodes of all the tree ensemble by exploiting an interleaved evaluation of all the trees in the ensemble.

Figure 5:
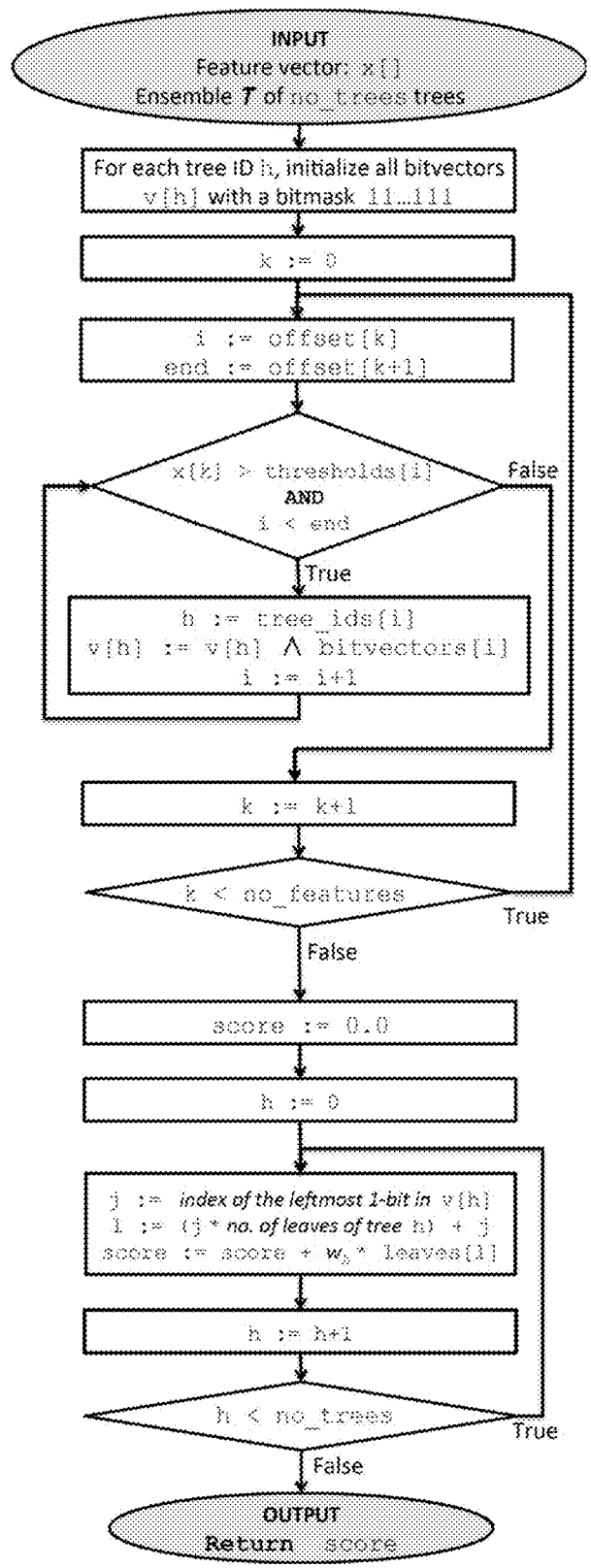
FIG. 5 shows a block diagram of invention method QS according to an aspect of the invention.

Making reference to FIG. 5, our invention QS method scores a feature vector x with an interleaved execution of several tree traversals, one for each tree in the ensemble. The method does not loop over all the trees in $\mathcal{T}$ one at the time, as one would expect, but does loop instead over all the features in $\mathcal{F}$, hence incrementally discovering for each $f_k \in \mathcal{F}$ the false nodes involving $f_k$ in any tree of the ensemble. This is a very convenient order for two reasons: i) we are able to identify all the false nodes for all the trees without even considering their true nodes, thus effectively implementing the oracle introduced in the previous section; ii) we are able to operate in a cache-aware fashion with a small number of Boolean comparisons and branch mis-predictions.

During its execution, QS has to maintain the bitvectors $v_h$'s, encoding the set $C_h$'s for all the tree $T_h$ in the ensemble. The bitvector $v_h$ of a certain tree is updated as soon as a false node for that tree is identified. Once the method has processed all the features in $\mathcal{F}$, each of these $v_h$ is guaranteed to encode the exit leaf in the corresponding tree. Now the method can compute the overall score of x by summing up (and, possibly, weighting) the scores of all these exit leaves.

Let us concentrate on the processing of a feature $f_k$ and describe the portion of the data structure of interest for this feature. The overall method simply iterates this process over all features in $\mathcal{F}$. Each node involving $f_k$ in any tree $T_h \in \mathcal{T}$ is represented by a triple containing: (i) the feature threshold involved in the Boolean test; (ii) the id of the tree that contains the node, where the id is used to identify the bitvector $v_h$ to update; (iii) the node bitvector used to possibly update $v_h$. We sort these triples in ascending order of their thresholds.

This sorting is important for obtaining a fast implementation of our oracle. Recall that all the conditions occurring in the internal nodes of the trees are all of the form $x[k] \leq \gamma_s^h$. Hence, given the sorted list of all the thresholds involving $f_k \in \mathcal{F}$, the feature value x[k] splits the list in two, possibly empty, sublists. The first sublist contains all the thresholds $\gamma_s^h$ for which the test condition $x[k] \leq \gamma_s^h$ evaluates to FALSE, while the second sublists contains all thresholds for which the test condition evaluates to TRUE. Thus, if we sequentially scan the sorted list of the thresholds associated with $f_k$, all the values in the first sublist will cause negative tests. Associated with these thresholds entailing false tests, we have false nodes belonging to the trees in $\mathcal{T}$. Therefore, for all these false nodes we can take in sequence the corresponding bitvector, and perform a bitwise logical AND with the appropriate result bitvector $v_h$.

This large sequence of tests that evaluates to FALSE corresponds to the repeated execution of conditional branch instructions, whose behavior is indeed very predictable. This is confirmed by our experimental results, showing that our code incurs in very few branch mis-predictions.

Figure 4:
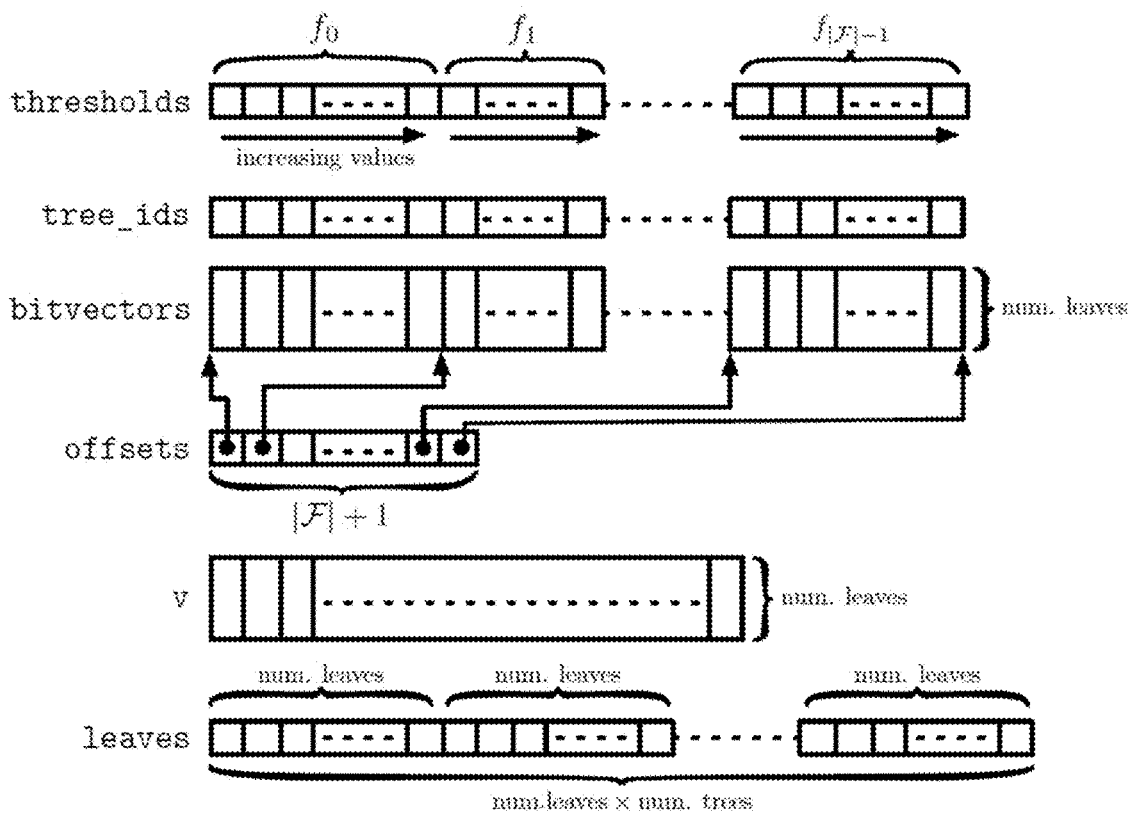
FIG. 4 shows arrays used by invention method QS, according to an aspect of the invention.

We now present the layout in memory of the required data structure since it is important for the efficiency of our method. The triples of each feature are stored in three separate arrays, one for each component: thresholds, tree_ids, and bitvectors. The use of three distinct arrays solves some data alignment issues arising when tuples of heterogeneous data types are stored contiguously in memory. The arrays of the different features are then juxtaposed one after the other as illustrated in FIG. 4. Since arrays of different features may have different lengths, we use an auxiliary array offsets which marks the starting position of each array in the global array. We also juxtapose the bitvectors $v_h$ into a global array v. Finally, we use an array leaves which stores the output values of the leaves of each tree (ordered from left to right) grouped by their tree id.

Method 2: The QUICKSCORER

```
Input :
• x: input feature vector
• T : ensemble of binary decision trees, with
    -   w_0,...,w_|T|-1: weights, one per tree
    -   thresholds: sorted sublists of thresholds, one sublist
        per feature
    -   tree_ids: tree's ids, one per threshold
    -   bitvectors: node bitvectors, one per threshold
    -   offsets: offsets of the blocks of triples
    -   v: result bitvectors, one per each tree
    -   leaves: output values, one per each tree leaf
Output:
• Final score of x
QUICKSCORER(x, T ):
 1   |   foreach h ∈ 0, 1,...,|T| − 1 do
 2   |   |_ v[h]← 11...11
 3   |   foreach k ∈ 0, 1,...,|F| − 1 do    // Step ①
 4   |   |   i ← offsets[k]
 5   |   |   end ← offsets[k + 1]
 6   |   |   while x[k] > thresholds[i] do
 7   |   |   |   h ← tree_ids[i]
 8   |   |   |   v[h] ← v[h] ∧ bitvectors[i]
 9   |   |   |   i ← i + 1
10   |   |   |   if i ≥ end then
11   |   |   |   |_ break
     |   |   |_
     |   |_
12   |   score ← 0
13   |   foreach h ∈ 0, 1,...,|T| − 1 do    // Step ②
14   |   |   j ← index of leftmost bit set to 1 of v[h]
15   |   |   l ← h · |L_h| + j
16   |   |_  score ← score + w_h · leaves[l]
17   |_  return score
```

Method 2 reports the steps of QS as informally described above. After the initialization of the result bitvectors of each tree (loop starting al line 1), we have the first step of QS that exactly corresponds to what we discussed above (loop starting at line 3). The method iterates over all features, and inspects the sorted lists of thresholds to update the result bitvectors. Upon completion of the first step, we have the second step of the method (loop starting at line 13), which simply inspects all the result bitvectors, and for each of them identifies the position of the leftmost bit set to 1, and uses this position to access the value associated with the corresponding leaf stored array leaves. The value of the leaf is finally used to update the final score.

Figure 6A:
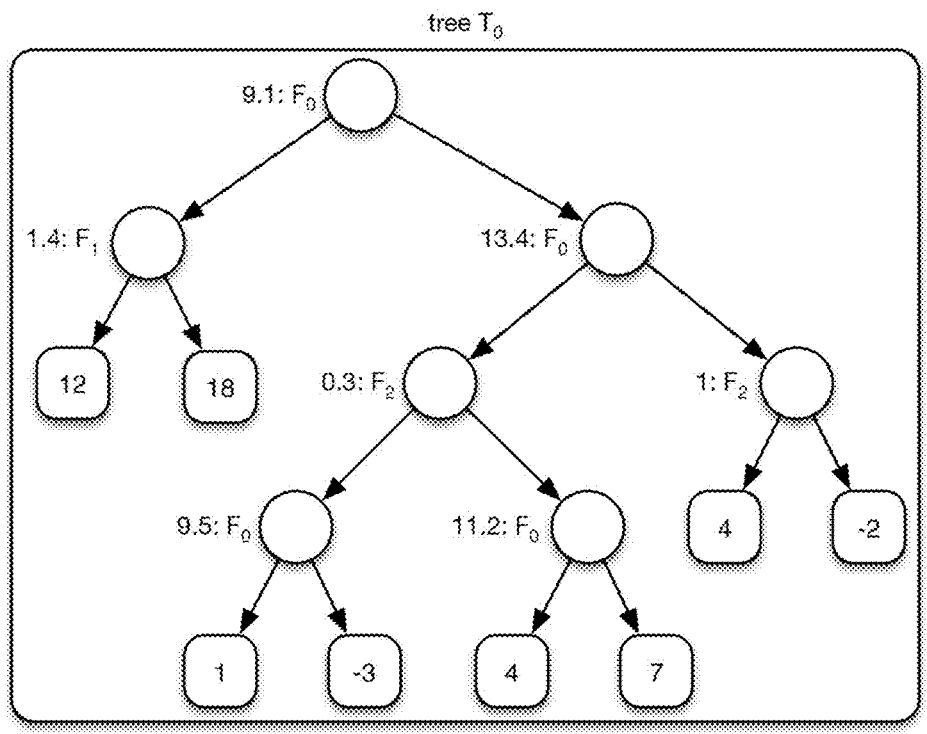
FIG. 6a shows a toy ensemble of regression trees, according to an aspect of the invention.
Figure 6B:
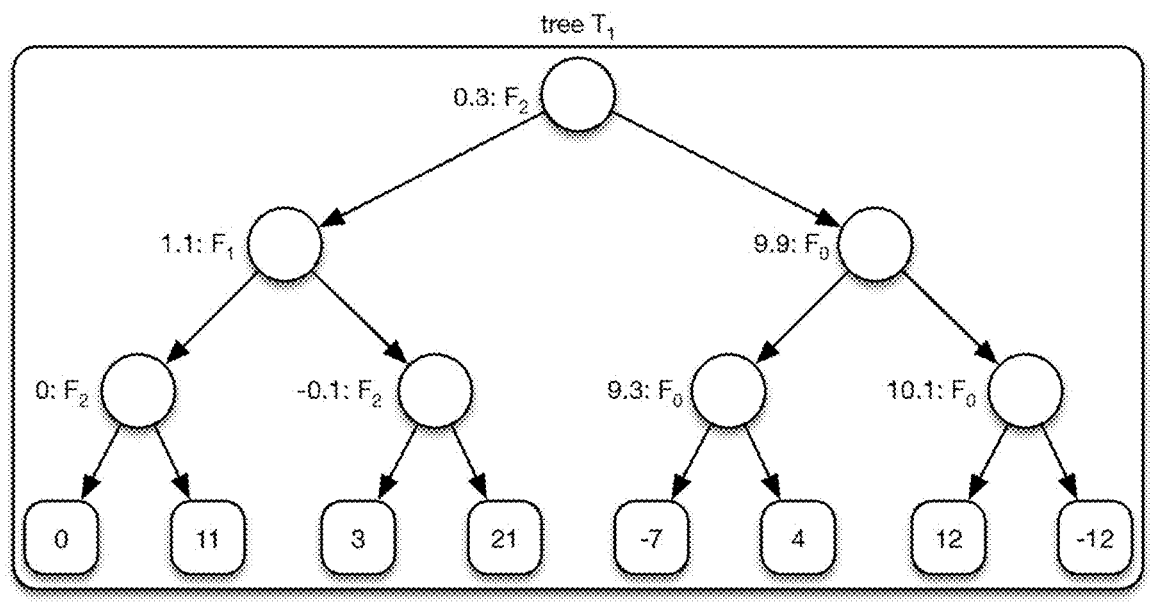
FIG. 6b shows another toy ensemble of regression trees, according to an aspect of the invention.

Let us consider the ensemble of regression trees $\mathcal{T}$ depicted in FIGS. 6a and 6b, only including the two trees $T_0$ and $T_1$. We assume that the ranking model of $\mathcal{T}$ was learned from a training dataset where each query-document pair is represented by a feature vector x[ ] with only three features, namely $F_0$, $F_1$ and $F_2$.

All the internal nodes of the two regression trees are labeled (see FIGS. 6a and 6b) with a pair ($\gamma$, $F\phi$), specifying the pair of parameters of the Boolean test x[$\varphi$]≤$\gamma$: a feature $F\phi \in \{F_0, F_1, F_2\}$, and a constant threshold $\gamma \in R$.

All the leaves of the two trees in turn store a value representing the potential contribution of the tree to the final score of the document.

Figure 7:
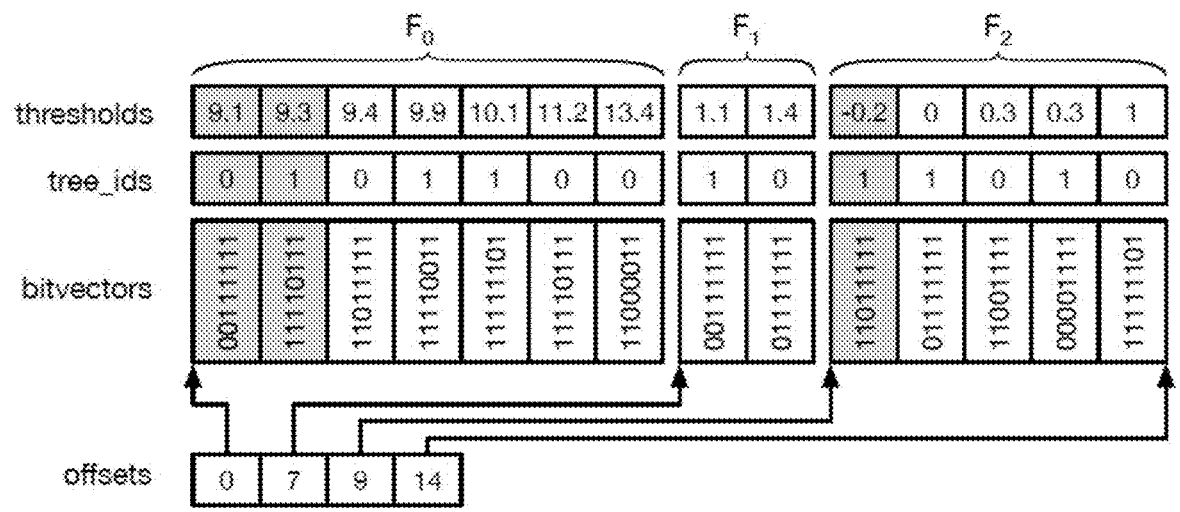
FIG. 7 shows a QS representation of the toy ranking model, according to an aspect of the invention.
Figure 8:
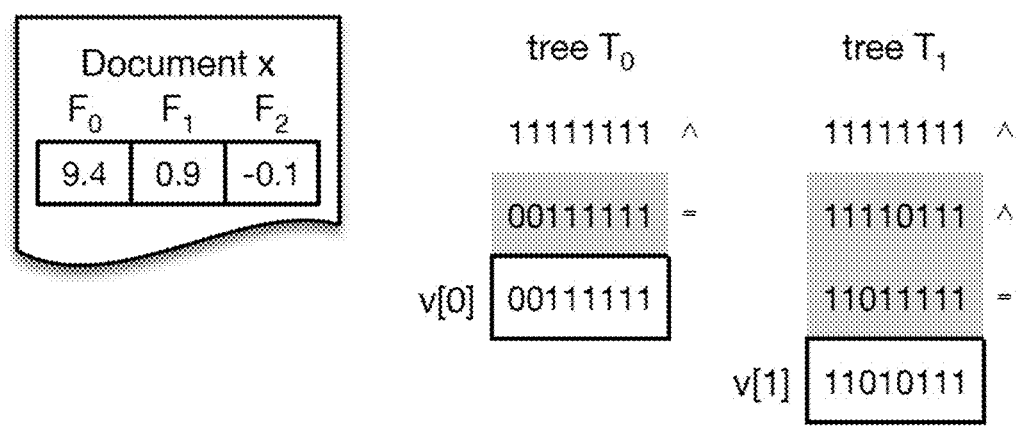
FIG. 8 shows an example of scoring of a document, according to an aspect of the invention.

Given this simple ranking model, QS compactly represents the ensemble $\mathcal{T}$ with the array data structures shown in FIGS. 7 and 8. In particular by analyzing the figure we can see that:

array thresholds has 14 elements storing the values of 7, 2, and 5 thresholds $\gamma$ associated, respectively, with the occurrences of the features $F_0$, $F_1$ and $F_2$ in the internal nodes of $\mathcal{T}$. We note that each block of thresholds is sorted in increasing order. Moreover, the first position of the ordered sequence of thresholds associated with a given feature $F_\phi \in \{F_0, F_1, F_2\}$ can be accessed directly by using the corresponding offset value stored in array offsets [$\varphi$].

array tree_ids is aligned to array thresholds. Specifically, given the $\varphi_{th}$ block of each array corresponding to feature $F\varphi$, let i be an index used to identify the current element of the block. Thus, i ranges in the integer interval [offsets[$\varphi$], offsets [$\varphi$+1]−1], and for each value of i the entry tree_ids[i] stores the ID of the tree, in turn containing a specific internal node with threshold thresholds [i]. For example, from the Figure we can see that a value 9.9 is stored in the 4-th position (i.e. element thresholds [3]) to indicate that this value is a threshold used for feature $F_0$ in the tree with ID tree_ids [3]=1.

the array bitvectors is also aligned to thresholds (and tree_ids).

Specifically, it stores in each position a bitvector of size equal to the (maximum) number of leaves of the trees in $\mathcal{T}$ (8 in this case). The bits in these bitvectors are set to 0 in correspondence to the leaves of the tree that are not reachable if the associated test fails. For example, bitvectors [3] stores 11110011, stating that the 5-th and the 6-th leaves of tree $T_1$ (tree_ids [3]=1) cannot be reached by documents for which the test x[0]≤9.9 (thresholds [3]=9.9) is FALSE.

Figure 9A:
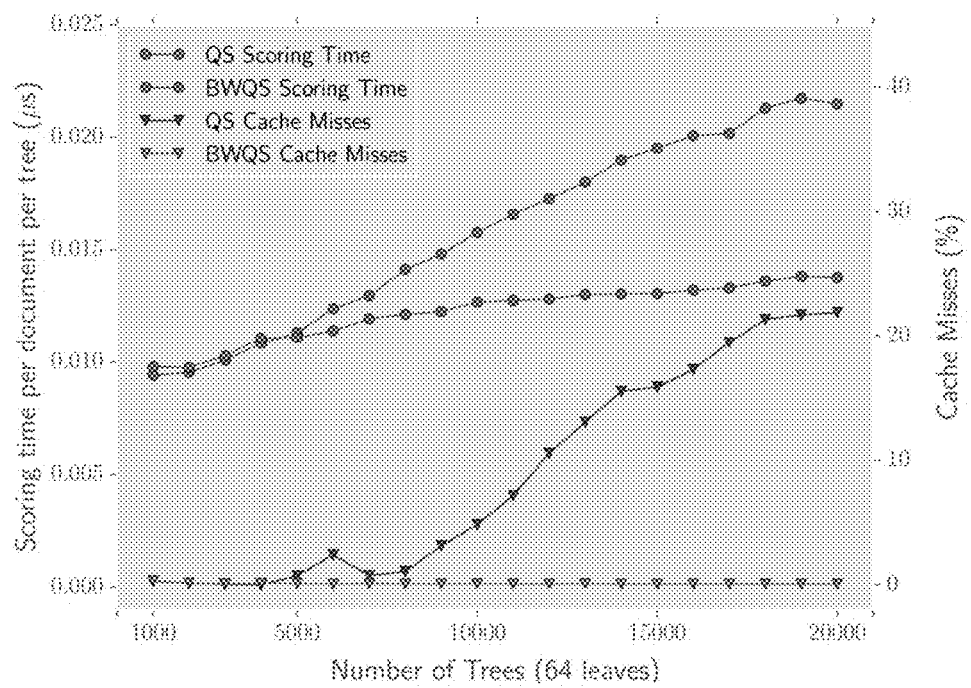
FIG. 9a shows a per-tree per-document scoring time in μs and percentage of cache misses of invention QS and BWQS on MSN-1 with 64-leaves λ-MART models.
Figure 9B:
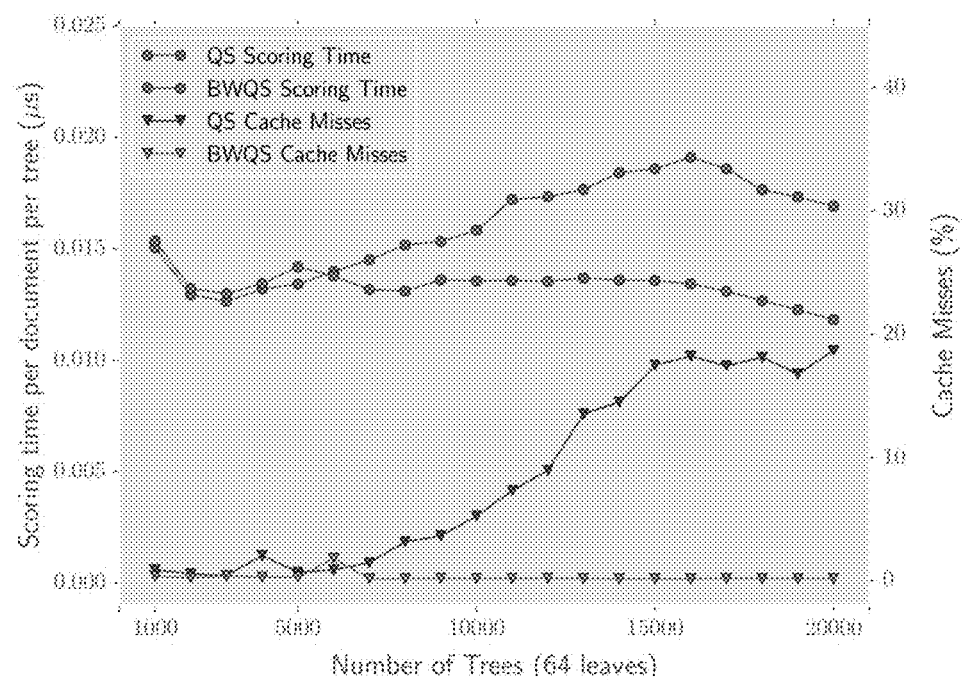
FIG. 9b shows a per-tree per-document scoring time in μs and percentage of cache misses of invention QS and BWQS on Y!S1 with 64-leaves λ-MART models.

Finally, FIGS. 9a and 9b show how the bitvectors selected by the QS method are used to devise the correct exit leaf of each tree. The Figure shows the feature vector x[ ] of a document to be scored. The bitvectors v[0] and v[1] are initialized with a string of 1's, whose length corresponds to the number of tree leaves (8 in this example). By visiting the ensemble $\mathcal{T}$ feature by feature, QS starts from the first feature $F_0$, by inspecting x[0]. The method thus accesses the list of thresholds of the feature starting from thresholds [offsets [0]], where offsets [0]=0. QS first detects that the first two tests involving feature x[0]=9.4 fail, since 9.4>9.1 (thresholds [0]=9.1) and 9.4>9.3 (thresholds [1]=9.3) hold. Thus, the two bitvectors 00111111 and 11110111, associated with the trees having respectively IDs tree_ids [0]=0 and tree_ids [1]=1, are retrieved. Then, a bitwise AND operation ($\wedge$) is performed between these bitvectors and the ones stored in v[0] and v[1]. Afterwards, since 9.4≤9.4 succeeds, features x[0] is considered totally processed, and QS continues with the next feature $F_1$, by inspecting x[1]=0.9. The lists of thresholds for feature x[1] is accessed starting from thresholds [offsets [1]], where offsets [1]=7. Since 0.9≤1.1 (thresholds [7]=1.1), the test succeeds, and thus the remaining elements of the threshold list associated with feature $F_1$ is skipped. Finally the last feature $F_2$, namely x[2], is considered and compared with the first threshold stored in thresholds [offsets [2]], where offsets [2]=9. The first test involving x[2]=−0.1, namely −0.1≤−0.2 (thresholds [9]=−0.2) fails. Since tree_ids [9]=1, a bitwise AND operation is thus performed between bitvectors [9] and v[1]. At this point, the next test over x[2] succeeds, and thus QS finishes the ensemble traversal. The content of the bitvectors v[0] and v[1] are finally used to directly read from array leaves the contribution of trees $T_0$ and $T_1$ to the final score of the document.

In the following we discuss some optional details about our data structures, their size and access modes.

A few important remarks concern the bitvectors stored in v and bitvectors. The learning method controls the accuracy of each single tree with a parameter $\Lambda$, which determines the maximal number of leaves for each $T_h = (N_h, L_h)$ in $\mathcal{T}$, namely $|L_h| \leq \Lambda$. Usually, the value of $\Lambda$ is kept small (≤64).

Thus, the length of bitvectors, which have to encode tree leaves, is equal to (or less than) a typical machine word of modern CPUs (64 bits). As a consequence, the bitwise operations performed by Method 2 on them can be realized very efficiently, because they involve machine words (or halfwords, etc).

We avoid any possible performance overhead due to shifting operations to align the operands of bitwise logical ANDs by forcing the bitvectors to have uniform length of B bytes. To this end, we pad each bitvector on its right side with a string of 0 bits, if necessary. We always select the minimum number of bytes $B \in \{1,2,4,8\}$ fitting $\Lambda$.

Let us now consider Table 1, which shows an upper bound for the size of each linear array used by our method. The array offsets has $|\mathcal{F}|$ entries, one entry for each distinct feature. The array v, instead, has an entry for each tree in $\mathcal{T}$, thus, $|\mathcal{T}|$ entries overall. The sizes of the other data structures depends on the number of total internal nodes or leaves in the ensemble $\mathcal{T}$, besides the datatype sizes. Any internal node of some tree of $\mathcal{T}$ contributes with an entry in each array thresholds, bitvectors and tree_ids. Therefore the total number of entries of each of these arrays can be upper bounded by $|\mathcal{T}| \cdot \Lambda$, because for every tree $T_h$ we have $|N_h| < |N_h|+1 = |L_h| \leq \Lambda$. Finally, the array leaves has an entry for each leaf in a tree of $\mathcal{T}$, hence, no more than $|\mathcal{T}| \cdot \Lambda$ in total.

TABLE 1

Data structures used by QS, the corresponding maximum sizes, and the access modes.

| Array | Maximum, Size (bytes) | Data access modes |
|---|---|---|
| thresholds | $\mathcal{T} \cdot \Lambda \cdot$ sizeof(float) | 1. Sequential (R) |
| tree_ids | $\mathcal{T} \cdot \Lambda \cdot$ sizeof(uint) | |
| bitvectors | $\mathcal{T} \cdot \Lambda \cdot B$ | |
| offsets | $\mathcal{F} \cdot$ sizeof(uint) | |
| v | $\mathcal{T} \cdot B$ | 1. Random (R/W) |
| | | 2. Sequential (R) |
| leaves | $\mathcal{T} \cdot \Lambda \cdot$ sizeof(double) | 2. Seq. Sparse (R) |

The last column of Table 1 reports the data access modes to the arrays, where the leading number, either 1 or 2, corresponds to the step of the method during which the data structures are read/written. Recall that the first step of QS starts at line 3 of Method 2, while the second at line 13. We first note that v is the only array used in both phases of function QUICKSORER(x, $\mathcal{T}$). During the first step v is accessed randomly in reading/writing to update the $v_h$'s. During the second step the same array is accessed sequentially in reading mode to identify the exit leafs $l_h$ of each tree $T_h$, and then to access the array leaves to read the contribution of tree $T_h$ to the output of the regression function. Even if the trees and their leaves are accessed sequentially during the second step of QS, the reading access to array leaves is sequential, but very sparse: only one leaf of each block of $|L_h|$ elements is actually read.

Finally, note that the arrays storing the triples, i.e., thresholds, tree_ids, and bitvectors, are all sequentially read during the first step, though not completely, since for each feature we stop its inspection at the first test condition that evaluates to TRUE. The cache usage can greatly benefit from the layout and access modes of our data structures, thanks to the increased references locality.

We finally describe an optimization which aims at reducing the number of comparisons performed at line 6 of Method 2. The (inner) while loop in line 6 iterates over the list of threshold values associated with a certain feature $f_k \in \mathcal{F}$ until we find the first index j where the test fails, namely, the value of the $k^{th}$ feature of vector x is greater than thresholds[j]. Thus, a test on the feature value and the current threshold is carried out at each iteration. Instead of testing each threshold in a prefix of thresholds[i:end], our optimized implementation test only one every $\Delta$ thresholds, where $\Delta$ is a parameter. Since the subvector thresholds[i:end] is sorted in ascending order, if a test succeed the same necessarily holds for all the preceding $\Delta-1$ thresholds. Therefore, we can go directly to update the result bitvector $v_h$ of the corresponding trees, saving $\Delta-1$ comparisons. Instead, if the test fails, we scan the preceding $\Delta-1$ thresholds to identify the target index j and we conclude. In our implementation we set $\Delta$ equal to 4, which is the value giving the best results in our experiments. We remark that in principle one could identify j by binary searching the subvector thresholds[i:end]. Experiments have shown that the use of binary search is not profitable because in general the subvector is not sufficiently long.

Let us consider an ensemble of regression trees composed by 1,000 trees. All trees are balanced, i.e. they are composed by 7 internal nodes and 8 leaf nodes similar to tree $T_1$ in toy example 1. Moreover let assume we have 100 features. Since there are a total of 7,000 internal nodes, we will have 7,000 threshold values, and we will assume that these value are evenly distributed among features, i.e., each feature is compared with 70 values.

We try to sketch an high-level, back for the envelop comparison between the IF-THEN-ELSE and QS approaches to score a single document using this ensemble. The IF-THEN-ELSE approach on such an ensemble will produce a long sequence of assembly instructions including nested branches. These instructions are executed one by one linearly, with potentially many jumps from one memory location to another, depending on the branch outcome. Conversely, the QS approach will lay out the required data in contiguous memory locations, and the QS instructions will be limited to two simple loops and a third loop with a nested simple one (see Method 2). This compact memory layout will fit in cache more easily the the IF-THEN-ELSE instructions. As a consequence, the number of cache evictions for QS will be reasonably lesser then the evitions for IF-THEN-ELSE, with less clock cycles spent to access the main memory.

Moreover, it is easy to check that IF-THEN-ELSE requires 3 comparisons per tree, for a total of 3,000 branches. We can expect, on average, that the branch prediction mechanism will correctly predict 50% of the branches, i.e. 1,500 branch mis-predictions. On the other side, QS will spend most of its time testing, for each feature, the associated values. For each feature, the corresponding document feature value is compared with all feature values in all trees, in increasing order. The cycle exit condition for a given feature will always be false, until it becomes true for the first time and the method moves on to the next feature. We can expect, on average, one branch mis-prediction per feature, i.e. 100.

Experiments

In this section we provide an extensive experimental evaluation that compares our QS method with other state-of-the-art competitors and baselines over standard datasets.

Datasets and Experimental Settings

Experiments are conducted by using publicly available LtR datasets: the MSN (http://research.microsoft.com/en-us/projects/mslr/) and the Yahoo! LETOR (http://learning-torankchallenge.yahoo.com) challenge datasets. The first one is split into five folds, consisting of vectors of 136 features extracted from query-document pairs, while the second one consists of two distinct datasets (Y!S1 and Y!S2), made up of vectors of 700 features. In this work, we focus on MSN-1, the first MSNfold, and Y!S1 datasets. The features vectors of the two selected datasets are labeled with relevance judgments ranging from 0 (irrelevant) to 4 (perfectly relevant). Each dataset is split in training, validation and test sets. The MSN-1 dataset consists of 6,000, 2,000, and 2,000 queries for training, validation and testing respectively. The Y!S1 dataset consists of 19,944 training queries, 2,994 validation queries and 6,983 test queries.

We exploit the following experimental methodology. We use training and validation sets from MSN-1 and Y!S1 to train Λ-MART [18] models with 8, 16, 32 and 64 leaves. We use QuickRank (http://quickrank.isti.cnr.it) an open-souceparallel implementation of Λ-MART written in C++11 for performing the training phase. During this step we optimize NDCG@10. The results of the invention can be also applied to analogous tree-based models generated by different state-of-the-art learning methods, e.g., GBRT [4]. We do not report results regarding the effectiveness of the trained models, since this is out of the scope of this description.

In our experiments we compare the scoring efficiency of QS with the following competitors:

IF-THEN-ELSE is a baseline that translates each tree of the forest as a nested block of if-then-else.

VPRED and STRUCT+[1] kindly made available by the authors (http://nasadi.github.io/OptTrees/).

All the methods are compiled with GCC 4.9.2 with the highest optimization settings. The tests are performed by using a single core on a machine equipped with an Intel Core i7-4770K clocked at 3.50 Ghz, with 32 GiB RAM, running Ubuntu Linux 3.13.0. The Intel Core i7-4770K CPU has three levels of cache. Level 1 cache has size 32 KB, one for each of the four cores, level 2 cache has size 256 KB for each core, and at level 3 there is a shared cache of 8 MB.

To measure the efficiency of each of the above methods, we run 10 times the scoring code on the test sets of the MSN-1 and Y!S1 datasets. We then compute the average per-document scoring cost. Moreover, to deeply profile the behavior of each method above we employ perf (https://perf.wiki.kernel.org), a performance analysis tool available under Ubuntu Linux distributions. We analyze each method by monitoring several CPU counters that measure the total number of instructions executed, number of branches, number of branch mis-predictions, cache references, and cache misses.

Scoring Time Analysis

The average time (in µs) needed by the different methods to score each document of the two datasets MSN-1 and Y!S1 are reported in Table 2. In particular, the table reports the per-document scoring time by varying the number of trees and the leaves of the ensemble employed. For each test the table also reports between parentheses the gain factor of QS over its competitors. At a first glance, these gains are impressive, with speedups that in many cases are above one order of magnitude. Depending on the number of trees and of leaves, QS outperforms VPRED, the most efficient solution so far, of factors ranging from 2.0× up to 6.5×. For example, the average time required by QS and VPRED to score a document in the MSN-1 test set with a model composed of 1,000 trees and 64 leaves, are 9.5 and 62.2 µs, respectively. The comparison between QS and IF-THEN-ELSE is even more one-sided, with improvements of up to 23.4× for the model with 10,000 trees and 32 leaves trained on the MSN-1 dataset. In this case the QS average per-document scoring time is 59.6 µs with respect to the 1396.8 µs of IF-THEN-ELSE. The last baseline reported, i.e., STRUCT+, behaves worst in all the tests conducted. Its performance is very low when compared not only to QS (up to 38.2× times faster), but even with respect to the other two algorithms VPRED and IF-THEN-ELSE. The reasons of the superior performance of QS over competitor algorithms are manyfold. We analyse the most relevant in the following.

TABLE 2

Per-document scoring time in s of QS, VPred, If-Then-Else and Struct+ on MSN-1 and Y!S1 datasets. Gain factors are reported in parentheses.

| Method | Λ | Number of trees/datasets | | | |
| --- | --- | --- | --- | --- | --- |
| | | 1,000 | | 5,000 | |
| | | MSN-1 | Y!S1 | MSN-1 | Y!S1 |
| QS | 8 | 2.2 (—) | 4.3 (—) | 10.5 (—) | 14.3 (—) |
| VPRED | | 7.9 (3.6x) | 8.5 (2.0x) | 40.2 (3.8x) | 41.6 (2.9x) |
| IF-THEN-ELSE | | 8.2 (3.7x) | 10.3 (2.4x) | 81.0 (7.7x) | 85.8 (6.0x) |
| STRUCT+ | | 21.2 (9.6x) | 23.1 (5.4x) | 107.7 (10.3x) | 112.6 (7.9x) |
| QS | 16 | 2.9 (—) | 6.1 (—) | 16.2 (—) | 22.2 (—) |
| VPRED | | 16.0 (5.5x) | 16.5 (2.7x) | 82.4 (5.0x) | 82.8 (3.7x) |
| IF-THEN-ELSE | | 18.0 (6.2x) | 21.8 (3.8x) | 126.9 (7.8x) | 130.0 (5.8x) |
| STRUCT+ | | 42.6 (14.7x) | 41.0 (6.7x) | 424.3 (26.2x) | 403.9 (15.2x) |
| QS | 32 | 5.2 (—) | 9.7 (—) | 27.1 (—) | 34.3 (—) |
| VPRED | | 31.9 (6.1x) | 31.6 (3.2x) | 165.2 (6.0x) | 162.2 (4.7x) |
| IF-THEN-ELSE | | 34.5 (6.6x) | 36.2 (3.7x) | 300.9 (11.1x) | 277.7 (8.0x) |
| STRUCT+ | | 69.1 (13.3x) | 67.4 (6.9x) | 928.6 (34.2x) | 834.6 (24.3x) |
| QS | 64 | 9.5 (—) | 15.1 (—) | 56.3 (—) | 66.9 (—) |
| VPRED | | 62.2 (6.5x) | 57.6 (3.8x) | 355.2 (6.3x) | 334.9 (5.0x) |

TABLE 2-continued

Per-document scoring time in s of QS, VPred, If-Then-Else and Struct+ on MSN-1 and Y!S1 datasets. Gain factors are reported in parentheses.

| | | | | |
|---|---|---|---|---|
| IF-THEN-ELSE | 55.9 (5.9x) | 55.1 (3.6x) | 933.1 (16.6x) | 935.3 (14.0x) |
| STRUCT+ | 109.8 (11.6x) | 116.8 (7.7x) | 1661.7 (29.5x) | 1554.5 (23.2x) |

| | | Number of trees/datasets | | | |
|---|---|---|---|---|---|
| | | 10,000 | | 20,000 | |
| Method | Λ | MSN-1 | Y!S1 | MSN-1 | Y!S1 |
| QS | 8 | 20.0 (—) | 25.4 (—) | 40.5 (—) | 48.1 (—) |
| VPRED | | 80.5 (4.0x) | 82.7 (3.3) | 161.4 (4.0x) | 164.8 (3.4.x) |
| IF-THEN-ELSE | | 185.1 (9.3x) | 185.8 (7.3x) | 709.0 (17.5x) | 772.2 (16.0x) |
| STRUCT+ | | 373.7 (18.7x) | 390.8 (15.4x) | 1150.4 (28.4x) | 1141.6 (23.7x) |
| QS | 16 | 32.4 (—) | 41.2 (—) | 67.8 (—) | 81.0 (—) |
| VPRED | | 165.5 (5.1x) | 165.2 (4.0x) | 336.4 (4.9x) | 336.1 (4.1x) |
| IF-THEN-ELSE | | 617.8 (19.0x) | 406.6 (9.9x) | 1767.3 (26.0x) | 1711.4 (21.1x) |
| STRUCT+ | | 1218.6 (37.6x) | 1191.3 (28.9x) | 2590.8 (33.2x) | 2621.2 (32.4x) |
| QS | 32 | 59.6 (—) | 70.3 (—) | 155.8 (—) | 160.1 (—) |
| VPRED | | 343.4 (5.7x) | 336.6 (4.8x) | 711.9 (4.5x) | 694.8 (4.3x) |
| IF-THEN-ELSE | | 1396.8 (23.4x) | 1389.8 (19.8x) | 3179.4 (20.4x) | 3105.2 (19.4x) |
| STRUCT+ | | 1806.7 (30.3x) | 1774.3 (25.2x) | 4610.8 (29.6x) | 4332.3 (27.0x) |
| QS | 64 | 157.5 (—) | 159.4 (—) | 425.1 (—) | 343.7 (—) |
| VPRED | | 734.4 (4.7x) | 706.6 (4.4x) | 1309.7 (3.0x) | 1420.7 (4.1x) |
| IF-THEN-ELSE | | 2496.5 (15.9x) | 2428.6 (15.2x) | 4662.0 (11.0x) | 4809.6 (14.0x) |
| STRUCT+ | | 3040.7 (19.3x) | 2937.3 (18.4x) | 5437.0 (12.8x) | 5456.4 (15.9x) |

Instruction Level Analysis

We used the perf tool to measure the total number of instructions, number of branches, number of branch mis-predictions, L3 cache references, and L3 cache misses of the different algorithms by considering only their scoring phase. Table 3 reports the results we obtained by scoring the MSN-1 test set by varying the number of trees and by fixing the number of leaves to 64. Experiments on Y!S1 are not reported here, but they exhibited similar behavior. As a clarification, L3 cache references accounts for those references which are not found in any of the previous level of cache, while L3 cache misses are the ones among them which miss in L3 as well. Table 3 also reports the number of visited nodes. All measurements are per-document and per-tree normalized.

We first observe that VPRED executes the largest number of instructions. This is because VPRED always runs d steps if d is the depth of a tree, even if a document might reach an exit leaf earlier. IF-THEN-ELSE executes much less instructions as it follows the document traversal path. STRUCT+ introduces some data structures overhead w.r.t. IF-THEN-ELSE. QS executes the smallest number instructions. This is due to the different traversal strategy of the ensemble, as QS needs to process the false nodes only. Indeed, QS always visits less than 18 nodes on average, out of the 64 present in each tree of the ensemble. Note that IF-THEN-ELSE traverses between 31 and 40 nodes per tree, and the same trivially holds for STRUCT+. This means that the interleaved traversal strategy of QS needs to process less nodes than in a traditional root-to-leaf visit. This mostly explains the results achieved by QS.

As far as number of branches is concerned, we note that, not surprisingly, QS and VPRED are much more efficient than IF-THEN-ELSE and STRUCT+ with this respect. QS has a larger total number of branches than VPRED, which uses scoring functions that are branch-free. However, those branches are highly predictable, so that the mis-prediction rate is very low, thus, confirming our claims in Section 3.

Observing again the timings in Table 2 we notice that, by fixing the number of leaves, we have a super-linear growth of QS's timings when increasing the number of trees. For example, since on MSN-1 with Λ=64 and 1,000 trees QS scores a document in 9.5 μs, one would expect to score a document 20 times slower, i.e., 190 μs, when the ensemble size increases to 20,000 trees. However, the reported timing of QS in this setting is 425.1 μs, i.e., roughly 44 times slower than with 1000 trees. This effect is observable only when the number of leaves Λ={32,64} and the number of trees is larger than 5,000. Table 3 relates this super-linear growth to the numbers of L3 cache misses.

Considering the sizes of the arrays as reported in Table 1 in Section 3, we can estimate the minimum number of trees that let the size of the QS's data structure to exceed the cache capacity, and, thus, the method starts to have more cache misses. This number is estimated in 6,000 trees when the number of leaves is 64. Thus, we expect that the number of L3 cache miss starts increasing around this number of trees. Possibly, this number is slightly larger, because portions of the data structure may be infrequently accessed at scoring time, due the small fraction of false nodes and associated bitvectors accessed by QS.

These considerations are further confirmed by FIG. 9, which shows the average per-tree per-document scoring time (μs) and percentage of cache misses QS when scoring the MSN-1 and the Y!S1 with Λ=64 by varying the number of trees. First, there exists a strong correlation between QS's timings and its number of L3 cache misses. Second, the number of L3 cache misses starts increasing when dealing with 9,000 trees on MSN and 8,000 trees on Y!S1.

BWQS: A Block-Wise Variant of QS

The previous experiments suggest that improving the cache efficiency of QS may result in significant benefits. As in Tang et al. [12], we can split the tree ensemble in disjoint blocks of size τ that are processed separately in order to let the corresponding data structures fit into the faster levels of the memory hierarchy. This way, we are essentially scoring each document over each tree blocks that partition the original ensemble, thus inheriting the efficiency of QS on smaller ensembles. Indeed, the size of the arrays required to score the documents over a block of trees depends now on τ instead of $|\mathcal{T}|$ (see Table 1 in Section 3). We have, however, to keep an array that stores the partial scoring computed so far for each document.

The temporal locality of this approach can be improved by allowing the method to score blocks of documents together over the same block of trees before moving to the next block of documents. To allow the method to score a block of δ documents in a single run we have to replicate in δ copies the array v. Obviously, this increases the space occupancy and may result in a worse use of the cache. Therefore, we need to find the best balance between the number of documents δ and the number of trees τ to process in the body of a nested loop that first runs over the blocks of trees (outer loop) and then over the blocks of documents to score (inner loop).

This method is called BLOCKWISE-QS (BWQS) and its efficiency is discussed in the remaining part of this section.

TABLE 3

Per-tree per-document low-level statistics on MSN-1 with 64-leaves λ-MART models.

| Method | Number of Trees | | | | |
|---|---|---|---|---|---|
| | 1,000 | 5,000 | 10,000 | 15,000 | 20,000 |
| Instruction Count | | | | | |
| QS | 58 | 75 | 86 | 91 | 97 |
| VPRED | 580 | 599 | 594 | 588 | 516 |
| IF-THEN-ELSE | 142 | 139 | 133 | 130 | 116 |
| STRUCT+ | 341 | 332 | 315 | 308 | 272 |
| Num. branch mis-predictions (above) | | | | | |
| Num. branches (below) | | | | | |
| QS | 0.162 | 0.035 | 0.017 | 0.011 | 0.009 |
| | 6.04 | 7.13 | 8.23 | 8.63 | 9.3 |
| VPRED | 0.013 | 0.042 | 0.045 | 0.049 | 0.049 |
| | 0.2 | 0.21 | 0.18 | 0.21 | 0.21 |
| IF-THEN-ELSE | 1.541 | 1.608 | 1.615 | 1.627 | 1.748 |
| | 42.61 | 41.31 | 39.16 | 38.04 | 33.65 |
| STRUCT+ | 4.498 | 5.082 | 5.864 | 6.339 | 5.535 |
| | 89.9 | 88.91 | 85.55 | 83.83 | 74.69 |
| L3 cache misses (above) | | | | | |
| L3 cache references (below) | | | | | |
| QS | 0.004 | 0.001 | 0.121 | 0.323 | 0.51 |
| | 1.78 | 1.47 | 1.52 | 2.14 | 2.33 |
| VPRED | 0.005 | 0.166 | 0.326 | 0.363 | 0.356 |
| | 12.55 | 12.6 | 13.74 | 15.04 | 12.77 |
| IF-THEN-ELSE | 0.001 | 17.772 | 30.331 | 29.615 | 29.577 |
| | 27.66 | 38.14 | 40.25 | 40.76 | 36.47 |
| STRUCT+ | 0.039 | 12.791 | 17.147 | 15.923 | 13.971 |
| | 7.37 | 18.65 | 20.54 | 19.87 | 18.38 |
| Num. Visited Nodes (above) | | | | | |
| Visited Nodes/Total Nodes (below) | | | | | |
| QS | 9.71 | 13.40 | 15.79 | 16.65 | 18.00 |
| | 15% | 21% | 25% | 26% | 29% |
| VPRED | 54.38 | 56.23 | 55.79 | 55.23 | 48.45 |
| | 86% | 89% | 89% | 88% | 77% |
| STRUCT+ | 40.61 | 39.29 | 37.16 | 36.15 | 31.75 |
| IF-THEN-ELSE | 64% | 62% | 59% | 57% | 50% |

TABLE 4

Per-document scoring time in μs of BWQS, QS and VPred algorithms on MSN-1.

| | | MSN-1 | | | Y!S1 | | |
|---|---|---|---|---|---|---|---|
| | | Block | | | Block | | |
| Λ | Method | δ | τ | Time | δ | τ | Time |
| 8 | BWQS | 8 | 20,000 | 33.5 (—) | 8 | 20,000 | 40.5 (—) |
| | QS | 1 | 20,000 | 40.5 (1.21x) | 1 | 20,000 | 48.1 (1.19x) |
| | VPRED | 16 | 20,000 | 161.4 (4.82x) | 16 | 20,000 | 164.8 (4.07x) |
| 16 | BWQS | 8 | 5,000 | 59.6 (—) | 8 | 10,000 | 72.34 (—) |
| | QS | 1 | 20,000 | 67.8 (1.14x) | 1 | 20,000 | 81.0 (1.12x) |
| | VPRED | 16 | 20,000 | 336.4 (5.64x) | 16 | 20,000 | 336.1 (4.65x) |
| 32 | BWQS | 2 | 5,000 | 135.5 (—) | 8 | 5,000 | 141.2 (—) |
| | QS | 1 | 20,000 | 155.8 (1.15x) | 1 | 20,000 | 160.1 (1.13x) |
| | VPRED | 16 | 20,000 | 711.9 (5.25x) | 16 | 20,000 | 694.8 (4.92x) |
| 64 | BWQS | 1 | 3,000 | 274.7 (—) | 1 | 4,000 | 236.0 (—) |
| | QS | 1 | 20,000 | 425.1 (1.55x) | 1 | 20,000 | 343.7 (1.46x) |
| | VPRED | 16 | 20,000 | 1309.7 (4.77x) | 16 | 20,000 | 1420.7 (6.02x) |

Table 4 reports average per-document scoring time in μs of methods QS, VPRED, and BWQS. The experiments were conducted on both the MSN-1 and Y!S1 datasets by varying Λ and by fixing the number of trees to 20,000. It is worth noting that our QS method can be thought as a limit case of BWQS, where the blocks are trivially composed of 1 document and the whole ensemble of trees. VPRED instead vectorizes the process and scores 16 documents at the time over the entire ensemble. With BWQS the sizes of document and tree blocks can be instead flexibly optimized according to the cache parameters. Table 4 reports the best execution times, along with the values of δ and τ for which BWQS obtained such results.

The blocking strategy can improve the performance of QS when large tree ensembles are involved. Indeed, the largest improvements are measured in the tests conducted on models having 64 leaves. For example, to score a document of MSN-1, BWQS with blocks of 3,000 trees and a single document takes 274.7 μs in average, against the 425.1 μs required by QS with an improvement of 4.77×.

The reason of the improvements highlighted in the table are apparent from the two plots reported in FIG. 9. These plots report for MSN-1 and Y!S1 the per-document and per-tree average scoring time of BWQS and its cache misses ratio. As already mentioned, the plot shows that the average per-document per-tree scoring time of QS is strongly correlated to the cache misses measured. The more the cache misses, the larger the per-tree per-document time needed to apply the model. On the other hand, the BWQS cache misses curve shows that the block-wise implementation incurs in a negligible number of cache misses. This cache-friendliness is directly reflected in the per-document per-tree scoring time, which is only slightly influenced by the number of trees of the ensemble.

Conclusions

We presented a novel method to efficiently score documents (texts, images, audios, videos, and any other information file) by using a machine-learned ranking function modeled by an additive ensemble of regression trees. A main contribution is a new representation of the tree ensemble based on bitvectors, where the tree traversal, aimed to detect the leaves that contribute to the final scoring of a document, is performed through efficient logical bitwise operations. In addition, the traversal is not performed one tree after another, as one would expect, but it is interleaved, feature by feature, over the whole tree ensemble. Tests conducted on publicly available LtR datasets confirm unprecedented speedups (up to 6.5×) over the best state-of-the-art competitor. The motivations of the very good performance figures of the invention method are diverse. First, linear arrays are used to store the tree ensemble, while the method exploits cache-friendly access patterns (mainly sequential patterns) to these data structures. Second, the interleaved tree traversal counts on an effective oracle that, with a few branch mis-predictions, is able to detect and return only the internal node in the tree whose conditions evaluate to FALSE. Third, the number of internal nodes visited by QS is in most cases consistently lower than in traditional methods, which recursively visits the small and unbalanced trees of the ensemble from the root to the exit leaf. All these remarks are confirmed by the deep performance assessment conducted by also analyzing low-level CPU hardware counters. This analysis shows that QS exhibits very low cache misses and branch mis-prediction rates, while the instruction count is consistently smaller than the counterparts. When the size of the data structures implementing the tree ensemble becomes larger the last level of the cache (L3 in our experimental setting), we observed a slight degradation of performance. To show that the invention method can be made scalable, a different embodiment called BWQS has been presented, a block-wise version of QS that splits the sets of feature vectors and trees in disjoint blocks that entirely fit in the cache and can be processed separately. Our experiments show that BWQS performs up to 1.55 times better than the original QS on large tree ensembles.

In the foregoing, preferred embodiments have been described and variations to the present invention have been suggested, but it is to be understood that those skilled in the art will be able to make modifications and changes without thereby falling outside the relevant scope of protection, as defined by the enclosed emails.

The invention claimed is:

1. A method of managing a cache memory configured to use a branch prediction mechanism to rank stored documents, in particular text or image or audio or video documents, using a ranking model represented by an ensemble $\mathcal{T}$ of additive regression trees $T_h$ with h=1, ... H, H being a positive integer, the method providing a score value for each document in a set of M candidate documents $d_i$ with i=1, ... , M according to their relevance to a given user query q, wherein ranking the documents according to the branch prediction mechanism comprises:

each query-document pair (q, $d_i$) is represented by a vector x whose component x[j] with j=1, ... , P, with P positive integer, is a numerical feature values representing a corresponding feature of the set $\mathcal{F} = \{f_0, f_1, \ldots f_P\}$ of features characterizing the query-document pair (q, $d_i$); each tree $T_h=(N_h, L_h)$ comprises a set of nodes $N_h=\{n_0, n_1, \ldots\}$, wherein each node is associated with a Boolean test over a specific feature $f_\varphi \in \mathcal{F}$ and a pre-determined feature threshold γ in the form of x[φ]≤γ, and a set of leaves $L_h=\{l_0, l_1, \ldots\}$, each leaf being associated to a prediction value representing the possible contribution of tree $T_h$ to the score value of a document, each node being the starting point of a right subtree and a left subtree connecting to respective node or leaf;

the nodes of said set of nodes whose Boolean conditions evaluate to FALSE are termed "false nodes," and "true nodes" otherwise;

the method providing, for a document, execution of a step of traversing all the trees $T_h$ in the ensemble $\mathcal{T}$, by taking the right subtree if a visited node is a false node, and the left subtree otherwise, until a leaf is reached, which is termed "exit leaf" $e_h(x) \in L_h$ with associated prediction value $e_h(x).val$, the score value s(x) of the document being finally computed as a weighted sum over the prediction values $e_h(x).val$ of each tree $T_h$;

wherein each tree $T_h$ is traversed and a corresponding set $C_h$ of candidate exit leaves is updated during the traversal, with $C_h \subseteq L_h$, including said exit leaf $e_h$, wherein initially $C_h$ contains all the leaves in $L_h$, wherein the following further steps are executed:

A. for each tree $T_h$, the Boolean test of all nodes in $N_h=\{n_0, n_1, \ldots\}$ are evaluated in an arbitrary order, B1. for a false node, the leaves in the left subtree are removed from $C_h$, B2. for a true node, the leaves in the right subtree are removed from $C_h$, C. the leftmost leaf in $C_h$ is taken as the exit leaf $e_h$;

wherein the set of candidate documents is split into blocks and the tree ensemble is split into disjoint groups, one block of documents and one block of trees being both stored in a cache memory of said computer at the same time, each block of document being scored with respect to each disjoint group.

2. Method according to claim 1, wherein $C_h$ is represented by a bitvector $v_h$, initialized with all bits equal to 1, and each node of the tree $T_h$ is associated to a node bitvector of the same length of $v_h$, and the following step is executed instead of steps B1 and B2:

B3. Performing a bitwise logical AND operation between vh and each node bitvector of a false node, In step C the exit leaf en corresponding to the leftmost bit in $v_h$.

3. Method according to claim 2, wherein step A, instead of evaluating the Boolean test of all nodes, provides the discovering, for each $f_k \in \mathcal{F}$, of the false nodes involving testing $f_k$ in any tree of the ensemble $\mathcal{T}$, wherein each node involving testing $f_k$ in any tree in $\mathcal{T}$ is represented by a triple containing: (i) the feature threshold involved in the Boolean test; (ii) a number id of the tree that contains the node, wherein the number id is used to identify the bitvector $v_k$ to be updated; (iii) the node bitvector used to possibly update $v_k$, wherein the set of said triples involving testing $f_k$ are sorted in ascending/descending order of their thresholds, and false nodes are determined by testing of a feature value against the threshold array and finding where the value of the feature threshold is reached in the ascending/descending order.

4. Method according to claim 3, wherein:

all the triples are stored in a cache memory of said computer in three separate arrays, a thresholds array, a tree ids array, and bitvectors array storing the corresponding thresholds, tree ids and bitvectors for each node in $\mathcal{T}$;

an offset array is used which marks the starting position of values of said three separate arrays corresponding to the nodes testing a feature;

a leaves array is used which stores the prediction values of the leaves of each node in $\mathcal{T}$, grouped by their tree id.

5. Method according to claim 3, wherein the testing of a feature value against the thresholds array is carried out only one every $\Delta$ thresholds in the thresholds array, wherein $\Delta$ is a pre-determined parameter, so that if a test succeeds the same necessarily holds for all the preceding $\Delta$-1 thresholds, instead, if the test fails, the preceding $\Delta$-1 thresholds are tested against the feature value.

6. Method according to claim 1, wherein, when a pre-defined number of candidate documents have been scored and a prediction value $e_h(x).val$ for a subsequent document is to be found with respect to a tree $T_h$, then such a subsequent document is discarded if $e_h(x).val$ is so low that the summation of any other prediction value from the remaining trees cannot give a sufficiently high score value $s(x)$.

7. Method according to claim 1, wherein the Boolean test has the form of $x[\varphi] \geq \gamma$, and the method providing, for a document, execution of a step of traversing all the trees $T_h$ in the ensemble $\mathcal{T}$, by taking the left subtree if a visited node is a false node, and the right subtree otherwise, and steps B1, B2, C are now:

B1. for a false node, the leaves in the right subtree are removed from $C_h$,

B2. for a true node, the leaves in the left subtree are removed from $C_h$,

C. the rightmost leaf in $C_h$ is taken as the exit leaf $e_h$.

8. Computer program product, comprising executable code and a processor coupled with memory and cache controller executed the method of claim 1.

* * * * *